United States Patent
Petzold et al.

(10) Patent No.: US 10,266,117 B2
(45) Date of Patent: Apr. 23, 2019

(54) DEVICE AND METHOD FOR PROVIDING A VEHICLE ENVIRONMENT VIEW FOR A VEHICLE

(71) Applicants: Conti Temic Microelectronic GmbH, Nuremberg (DE); Deere & Company, Moline, IL (US)

(72) Inventors: Johannes Petzold, Muenchberg (DE); Kilian Wolff, Moline, IL (US)

(73) Assignees: Conti Temic Microelectronic GMBH, Nuremberg (DE); Deere & Company, Moline, IL (US)

( * ) Notice: Subject to any disclaimer, the term of this patent is extended or adjusted under 35 U.S.C. 154(b) by 183 days.

(21) Appl. No.: 15/331,185

(22) Filed: Oct. 21, 2016

(65) Prior Publication Data

US 2017/0120822 A1   May 4, 2017

(30) Foreign Application Priority Data

Oct. 30, 2015  (DE) .......................... 10 2015 221 340

(51) Int. Cl.
  *B60R 1/00* (2006.01)
  *H04N 7/18* (2006.01)
  (Continued)

(52) U.S. Cl.
  CPC ................ *B60R 1/002* (2013.01); *B60Q 1/00* (2013.01); *B60R 1/00* (2013.01); *E02F 9/2037* (2013.01); *E02F 9/2054* (2013.01); *E02F 9/262* (2013.01); *G06K 9/00791* (2013.01); *G08G 1/0962* (2013.01); *H04N 7/181* (2013.01); *B60R 2300/105* (2013.01); *B60R 2300/205* (2013.01); *B60R 2300/207* (2013.01); *G06K 2009/363* (2013.01)

(58) Field of Classification Search
  CPC .. H60R 1/002; H04N 7/181; B60R 2300/105; B60R 2300/207; B60R 2300/205
  USPC ......................................................... 348/148
  See application file for complete search history.

(56) References Cited

U.S. PATENT DOCUMENTS

2008/0309784 A1   12/2008   Asari et al.
2009/0310088 A1*  12/2009   Jung ..................... H04N 9/3147
                                                                        353/69

(Continued)

FOREIGN PATENT DOCUMENTS

DE    102006003524 A1   7/2007
DE    10 2011 084554 A1   4/2013

(Continued)

OTHER PUBLICATIONS

European Search Report corresponding to European application No. 16194908.6, dated Mar. 24, 2017 (9 pages).

*Primary Examiner* — Hee-Yong Kim
(74) *Attorney, Agent, or Firm* — Maginot, Moore & Beck, LLP (57) ABSTRACT

A device for providing a vehicle environment view for a vehicle includes a plurality of vehicle cameras configured to provide camera images of a vehicle environment of the vehicle, and an image data processing unit configured, based on a detected movement space of at least one vehicle component of the vehicle and/or of the entire vehicle, to adapt a projection surface onto which the camera images provided by the vehicle cameras are projected to generate the vehicle environment view.

14 Claims, 5 Drawing Sheets

(51) Int. Cl.
    *E02F 9/20*         (2006.01)
    *E02F 9/26*         (2006.01)
    *B60Q 1/00*        (2006.01)
    *G06K 9/00*        (2006.01)
    *G08G 1/0962*    (2006.01)
    *G06K 9/36*        (2006.01)

(56) References Cited

U.S. PATENT DOCUMENTS

| | | | |
|---|---|---|---|
| 2011/0208399 A1* | 8/2011 | Fekete | G08G 1/0104 701/93 |
| 2013/0222573 A1 | 8/2013 | Onuma et al. | |
| 2014/0320637 A1 | 10/2014 | Yi | |
| 2016/0137125 A1* | 5/2016 | Petrany | B60R 1/00 348/148 |
| 2017/0341582 A1* | 11/2017 | Friebe | B60R 1/00 |

FOREIGN PATENT DOCUMENTS

| | | |
|---|---|---|
| DE | 10 2011 087901 A1 | 6/2013 |
| DE | 11 2012 004354 T5 | 7/2014 |
| DE | 10 2013 212683 A1 | 12/2014 |
| DE | 102014208664 | 11/2015 |
| EP | 0845198 A1 | 6/1998 |
| EP | 2433837 A1 | 3/2012 |
| JP | 2009 232310 A | 10/2009 |
| JP | 2012 023658 A | 2/2012 |
| JP | 2012 138660 A | 7/2012 |
| WO | 2015149970 A1 | 10/2015 |
| WO | WO 2015149970 * | 10/2015 |

* cited by examiner

DEVICE AND METHOD FOR PROVIDING A VEHICLE ENVIRONMENT VIEW FOR A VEHICLE

This application claims priority under 35 U.S.C. § 119 to patent application no. DE 10 2015 221 340.4, filed on Oct. 30, 2015 in Germany, the disclosure of which is incorporated herein by reference in its entirety.

The disclosure relates to a method and to a device for providing a vehicle environment view for a vehicle, in particular for a construction vehicle or an agricultural machinery vehicle.

BACKGROUND

EP2433837 A1 describes an agricultural machine comprising a camera system for providing an all-round view.

EP0845198 A1 describes an agricultural machine comprising sensors for detecting the position of a working implement.

Vehicles are increasingly equipped with driver assistance systems which assist a driver of the vehicle when carrying out driving manoeuvres. Driver assistance systems of this type comprise display units which visually display a vehicle environment view of the vehicle environment to the driver. For this purpose, the vehicle is equipped with a plurality of vehicle cameras which are attached to different sides of the vehicle body and provide camera images of the vehicle environment. An image data processing unit of the driver assistance system generates, from the transmitted camera images, a vehicle environment view or a surround view, in which the camera images are projected or mapped onto a projection surface. The projection surface is conventionally a three-dimensional, dish-shaped surface. In this case, it is assumed that the ground of the immediate environment of the vehicle is approximately flat. In many driving situations, however, this is not the case. For example, construction vehicles and forestry vehicles are often located in a vehicle environment which is irregular and comprises for example trenches, mounds of debris, and walls. This partially leads to inaccurate mapping or projections of the camera images onto the artificial or virtual projection surface, which do not reflect the actual environment. Therefore, in the case of conventional driver assistance systems for such vehicles, the images of the vehicle environment view which are displayed on the display unit are distorted.

The problem addressed by the disclosure is thus that of providing a device and a method for providing a vehicle environment view for a vehicle in which the image quality of the displayed vehicle environment view is increased.

This problem is solved according to the disclosure by a device having the features described herein.

SUMMARY

According to a first aspect, the disclosure thus provides a device for providing a vehicle environment view for a vehicle comprising vehicle cameras, which are configured to provide camera images of a vehicle environment of the vehicle, and comprising an image data processing unit which is configured, based on a detected movement space of at least one vehicle component of the vehicle and/or of the entire vehicle, to adapt a projection surface, onto which the camera images provided by the vehicle cameras are projected to generate the vehicle environment view.

In one possible embodiment of the device according to the disclosure, the vehicle component of the vehicle comprises at least one controllable, movable actuator.

In another possible embodiment of the device according to the disclosure, the vehicle component comprises a work tool, which can be moved into a movement space of each vehicle component in order to carry out operations.

In another possible embodiment of the device according to the disclosure, the vehicle component comprises a hydraulically actuatable arm, to which the work tool is attached.

In another possible embodiment of the device according to the disclosure, the work tool of the vehicle component is a shovel for carrying out groundwork operations in the vehicle environment of the vehicle.

In another possible embodiment of the device according to the disclosure, a detection unit is provided, which detects the movement space of the vehicle component and/or of the vehicle.

In another possible embodiment of the device according to the disclosure, the detection unit detects movement trajectories of the vehicle component and, based on the detected movement trajectories, detects the movement space of each vehicle component.

In another possible embodiment of the device according to the disclosure, the image data processing unit additionally adapts the projection surface according to navigation data and/or spatial data which the image data processing unit obtains from a navigation system of each vehicle and/or from an adjacent vehicle.

In another possible embodiment of the device according to the disclosure, the projection surface is a dish-shaped projection surface which is adapted according to the detected movement space.

In another possible embodiment of the device according to the disclosure, the image data processing unit dynamically adapts the projection surface starting from an original projection surface in the case of a sensor-detected movement of the vehicle component and/or in the case of a movement of the vehicle according to the movement space of the vehicle component and/or of the vehicle which is detected by a detection unit.

In another possible embodiment of the device according to the disclosure, the dish-shaped projection surface is geometrically deformed by the image data processing unit according to the detected movement space of the vehicle component.

In this case, the projection surface is dented or bulged according to the detected movement space.

In another possible embodiment of the device according to the disclosure, a display unit is provided, which displays the vehicle environment view, which is generated by the image data processing unit, to a driver of the vehicle.

The disclosure further provides a method for generating a vehicle environment view for a vehicle having the features described herein.

The disclosure thus provides a method for generating a vehicle environment view for a vehicle, comprising the steps of:

providing camera images of a vehicle environment of the vehicle, detecting a movement space of a vehicle component of the vehicle and/or of the entire vehicle, adapting a projection surface according to the detected movement space, and projecting the provided camera images onto the adapted projection surface to generate the vehicle environment view.

In one possible embodiment of the method according to the disclosure, a three-dimensional movement space of the vehicle component is detected based on detected movement trajectories of the vehicle component which is moved by means of actuators.

According to another aspect, the disclosure further provides a driver assistance system having the features described herein.

The disclosure thus provides a driver assistance system for a vehicle comprising a device for providing a vehicle environment view for a vehicle comprising vehicle cameras, which provide camera images of a vehicle environment of the vehicle, and comprising an image data processing unit which, based on a detected movement space of at least one vehicle component of the vehicle and/or of the entire vehicle, adapts a projection surface, onto which the camera images provided by the vehicle cameras are projected to generate the vehicle environment view.

BRIEF DESCRIPTION OF THE DRAWINGS

Hereinafter, possible embodiments of the device according to the disclosure and of the method according to the disclosure for providing a vehicle environment view for a vehicle are described in greater detail, with reference to the accompanying drawings, in which.

DETAILED DESCRIPTION

Figure 1:
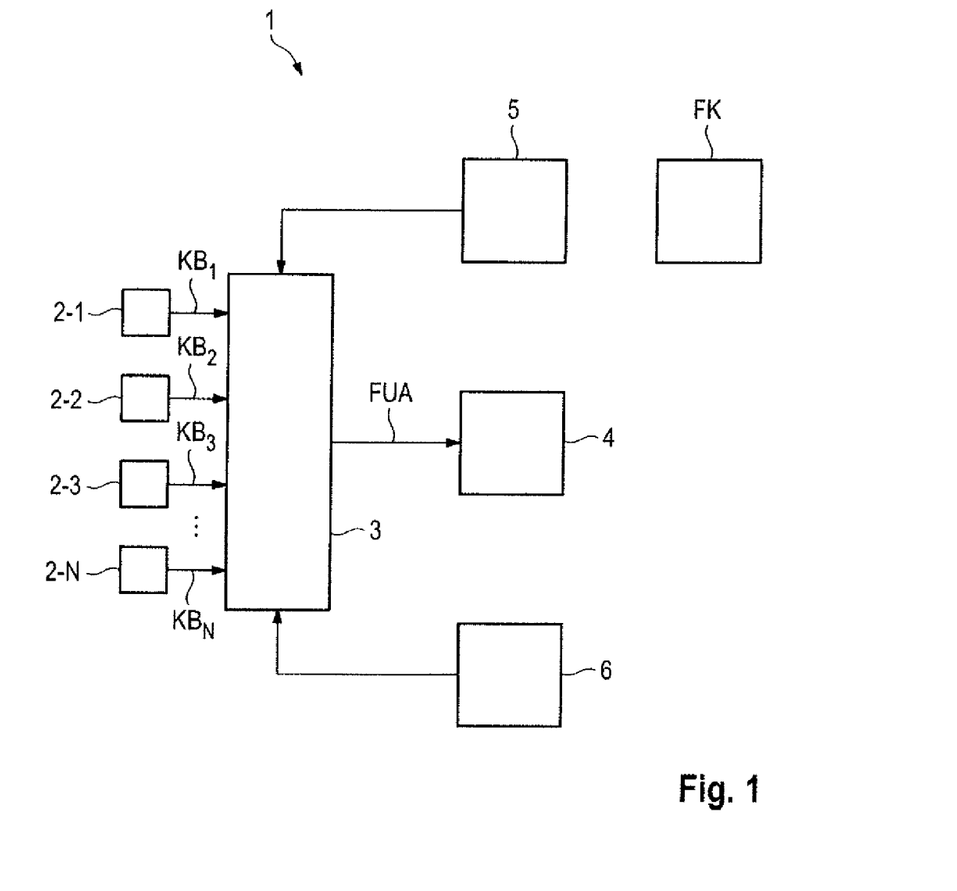
FIG. 1 is a block diagram showing an embodiment of the device according to the disclosure for providing a vehicle environment view.

As can be seen from the block diagram in FIG. 1, in the embodiment shown, a device 1 for providing a vehicle environment view FUA for a vehicle F comprises a plurality of cameras 2-1, 2-2, 2-3, . . . 2-n, which generate camera images KB of a vehicle environment of the vehicle F and provide or transmit said images to an image data processing unit 3 via signal lines. The vehicle cameras 2-i can be attached on different sides of the vehicle body of the vehicle F and each provide camera images KB of the vehicle environment. The number N of the vehicle cameras can vary depending on the size and function of the vehicle F. In one possible embodiment, the vehicle cameras 2-i are fisheye cameras having an aperture angle of more than 170°, preferably more than 175°. The image data processing unit 3 comprises one or more processors which carry out image data processing of the image data which are received from the vehicle cameras 2-i. The image data processing unit 3 adapts a projection surface PF based on a detected movement space of at least one vehicle component FK of the vehicle and/or of the entire vehicle F. The camera images or image data which are provided by the vehicle cameras 2-i are projected or mapped onto this adapted projection surface PF' to generate the vehicle environment view FUA. The generated vehicle environment view FUA is for example a 360° surround view of the vehicle environment, which is transmitted from the image data processing unit 3 to a display unit 4. The display unit 4 visually shows the generated vehicle environment view FUA to a driver of the vehicle F.

The device 1 for providing a vehicle environment view FUA for a vehicle further comprises a detection unit 5, which detects the movement space of a vehicle component FK or of the entire vehicle F. In one possible embodiment, the detection unit 5 detects movement trajectories of the vehicle component FK and detects or calculates, based on the detected movement trajectories, the movement space of each vehicle component FK.

FIG. 1 is a schematic view of a vehicle component FK of the vehicle. The vehicle component FK in this case preferably comprises at least one controllable, movable actuator. By controlling the actuators, the vehicle component FK, which for its part can consist of a plurality of components, carries out one or more superimposed movement trajectories in a three-dimensional movement space. In one possible embodiment, the vehicle component FK comprises a work tool, which is controlled and moved in order to carry out operations in the movement space of the vehicle environment. In one possible embodiment, the vehicle component FK further comprises a hydraulically actuatable arm, to which each work tool AW is attached. In one possible embodiment, said work tool AW has a shovel for carrying out groundwork operations in the vehicle environment of the vehicle.

The detection of the movement space of the vehicle component FK by means of the detection unit 5 can take place in different ways. In one possible embodiment, the movement space of the vehicle component FK is detected by the detection unit 5 using sensors. Alternatively, the movement space of the vehicle component FK can be detected according to control data which are used to control the actuators of each vehicle component FK. Depending on the application, the vehicle component FK can be different components or assemblies. When actuated, the vehicle component FK preferably changes the vehicle environment of the vehicle. For example, by means of an excavator arm and a shovel which is attached thereto, a trench or a hole in the immediate vehicle environment of the vehicle F can be dug out or excavated. Another example is a timber harvesting machine, in which tree trunks or branches of trees which are located in the immediate environment of the timber harvesting machine are sawed off and removed by means of a sawing tool. As a result of the vehicle component FK being moved and actuated in a three-dimensional movement space, the immediate vehicle environment of the vehicle thus changes. The image data processing unit 3, based on this detected movement space, adapts a virtual projection surface PF, onto which the camera images KB provided by the vehicle cameras 2-i are projected to generate the vehicle environment view FUA. The adapted projection surface PF' thus directly reflects the change which has taken place in the vehicle environment as a result of the intervention carried out by the vehicle component FK. This results in image distortions due to the dynamically changing vehicle environment being reduced or prevented during the projection so that the quality of the vehicle environment view FUA which is displayed on the display unit 4 is considerably increased.

In one possible embodiment, additional information for the driver is superimposed on the displayed vehicle environment view FUA. For example, in the vehicle environment view which is shown on the display unit 4, the movement trajectory which is expected in the future is shown, which trajectory the vehicle F will probably take in the case of the current steering angle. Furthermore, for example in order to increase the realistic image display (augmented reality), additional information relating to the ground conditions is displayed in a superimposed manner. Furthermore, in a superimposed view, additional information can be displayed, for example the location of supply lines in the vehicle environment, in particular gas and water lines. The quality and precision of this superimposed information is likewise considerably increased by the device according to the disclosure and the method according to the disclosure for providing a vehicle environment view FUA, since the shown vehicle environment view is less distorted and considerably more precise due to the adapted projection surface PF. Carrying out operations in the vehicle environment of the vehicle is facilitated hereby, and the degree of security required against erroneous interventions in the vehicle environment of the vehicle F is reduced. For example, the risk that a gas or water line in the immediate vehicle environment will be damaged by groundwork operations carried out is reduced due to the increased image quality of the vehicle environment view FUA. In one possible embodiment, the movement space of the at least one vehicle component FK, for example of an excavator arm having an excavator shovel attached thereto, is derived from the control data which control the actuators in order to move the vehicle component FK. In this embodiment, the detection unit calculates the movement space of the vehicle component FK based on the measured control data. This embodiment provides the advantage that no additional sensors have to be provided for detecting the movement space of the vehicle component FK using sensors. Furthermore, the device according to the disclosure and the method according to the disclosure provide the advantage that, in order to generate the higher-quality vehicle environment view FUA, no three-dimensional map of the vehicle environment is required. Moreover, the device according to the disclosure and the method according to the disclosure directly take into consideration the changes made in the vehicle environment.

In another possible embodiment of the device 1 according to the disclosure, the virtual projection surface PF is additionally adapted by the image processing unit 3 according to navigation data and/or spatial data which the image data processing unit 3 obtains from a navigation system 6 of the vehicle and/or from an adjacent vehicle. In one possible embodiment, a navigation system 6 of the vehicle additionally provides position or spatial data which are taken into consideration when adapting the projection surface PF by means of the image data processing unit 3. In another possible embodiment, position or spatial data of this type can also be received by a receiver of the vehicle from an adjacent vehicle, for example another construction vehicle. On a construction site, which has for example several excavated trenches or mounds, it is thus possible for different construction vehicles, for example excavators or bulldozers, to exchange movement space data, navigation data or position data with one another in order to obtain a uniform image of the construction site.

In one possible embodiment, the virtual projection surface PF which is used by the data processing unit 3 for projection is a dish-shaped projection surface. Depending on the application, other types of projection surfaces can also be used, for example ellipsoidal projection surfaces or planar projection surfaces. The projection surface is preferably dynamically adapted according to the detected movement space of the vehicle component FK or of the entire vehicle. In this case, the image data processing unit 3 dynamically adapts the projection surface, starting from an original projection surface, according to the detected movement space of the vehicle component FK and/or of the entire vehicle. This preferably takes place when a movement of the vehicle component FK or of the entire vehicle is detected by sensors. In one possible embodiment, the original projection surface is a dish-shaped projection surface, which is geometrically deformed according to the detected movement space of the vehicle component FK and/or of the vehicle by the data processing unit. For example, the projection surface PF can be dented or bulged by the data processing unit according to the detected movement space, as is shown schematically in FIGS. 3A and 3B.

The movement trajectories of the movable vehicle components FK, for example of excavator arms or front-loaders, are used in the device according to the disclosure and the method according to the disclosure in order to obtain additional information or data about the vehicle environment over time. If for example an excavator excavates a hole or a trench in the immediate vehicle environment of the vehicle F, the excavator arm grabs below the normal driving plane FE of the vehicle F. Since, in construction vehicles, the current position and location of the vehicle component FK or of the excavator arm is always known, said vehicle component FK can thus be used to a certain extent as a sensor unit to detect a movement space. Based on the positions reached by the arm, the shape and condition of the vehicle environment, in particular of the ground driven over by the vehicle F, is detected over time and continuously refined. Said data can additionally be used to optimise the movement of the vehicle F over the driving ground. If the vehicle passes for example an unevenly shaped surface or driving ground, this can be detected or captured by a global navigation satellite system, for example received GPS data also being taken into consideration by the data processing unit 3 when adapting the projection surface PF. In order to increase the image quality and the environment region which is covered, the information data which are obtained, in particular the data relating to the movement space of the vehicle component FK, the navigation data and the spatial data can be exchanged or shared between different vehicles and construction machinery which are located on the same construction site. For this purpose, the vehicles and construction machinery preferably comprise transceivers in order to exchange corresponding information data with one another via an air interface. This can preferably take place via a determined transmission channel. In another possible embodiment, the obtained information data, i.e. the movement space data, the position data and the navigation data of the different vehicles, are transmitted to a central processor Z, which generates an overall data model of the construction site BS from the information data received and continuously updates said model based on the information data received. In one possible embodiment, this construction site data model is compared with an existing data model of the construction site so that the progress or the changes in the construction site BS can always be observed.

Figure 2:
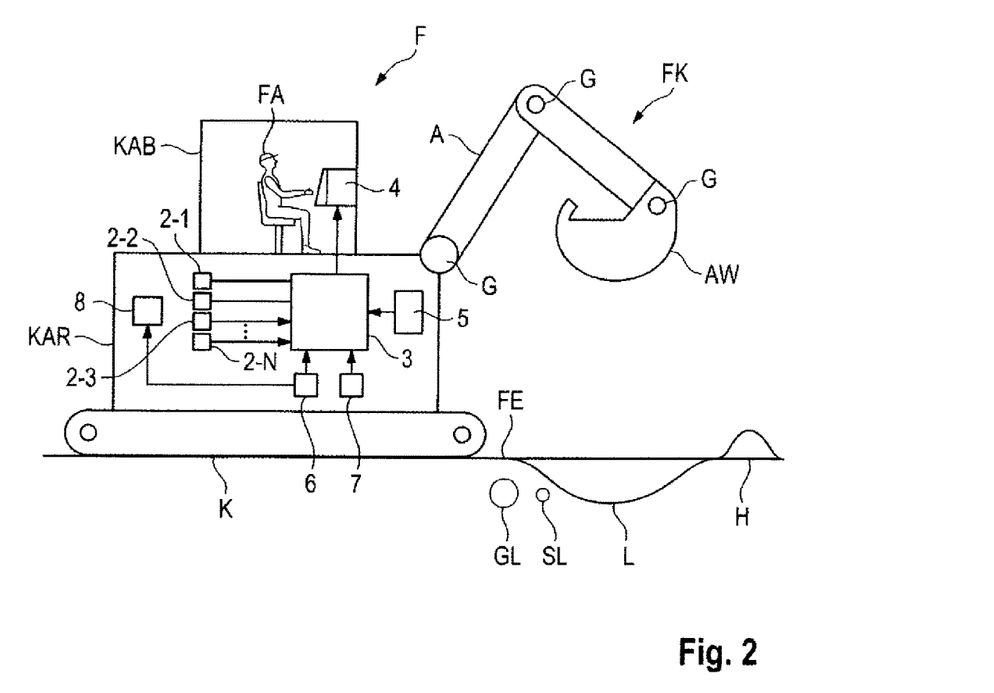
FIG. 2 is a schematic view of a vehicle which uses the device according to the disclosure and the method according to the disclosure to provide a vehicle environment view.

FIG. 2 is a schematic view of one embodiment for a vehicle F in which the device 1 according to the disclosure and the method according to the disclosure are used to provide a vehicle environment view FUA. The example shown is a construction vehicle, in particular an excavator, for carrying out groundwork operations. The excavator shown is a tracklaying vehicle comprising a track drive K which supports a vehicle body KAR of the vehicle. Furthermore, the vehicle F comprises a driver's cabin KAB, in which a driver FA sits and steers and controls the vehicle F. The excavator shown in FIG. 2 comprises a controllable vehicle component FK for carrying out operations in the vehicle environment of the vehicle. In the embodiment shown, the vehicle component FK comprises a hydraulically actuatable arm A, to which a work tool AW is attached. In the embodiment shown, the work tool AW is a shovel for carrying out groundwork operations in the vehicle environment. Controllable, movable actuators are provided to move the vehicle component FK, which actuators for example hydraulically drive the arm of the vehicle component FK. As shown schematically in FIG. 2, the vehicle component FK comprises one or more joints G for moving the various components of the vehicle component FK relative to one another. FIG. 2 further schematically shows a driving plane or a driving ground FE which extends substantially horizontally. In the example application shown, the vehicle F excavates, by means of the vehicle component thereof or an excavator shovel, a trench or a hole L in the driving plane FE. For this purpose, the work tool or the shovel AW is placed on the driving ground or driving plane and controlled in such a way that soil is excavated. In the example shown, the excavated soil is deposited next to the hole and forms a corresponding mound H. By means of the groundwork operations carried out, the immediate vehicle environment of the vehicle changes, i.e. from the relatively smooth original driving plane FE, an irregularly shaped surface comprising a hole L and a mound H is formed in front of the excavator F. When carrying out the groundwork operations, each shovel movement of the vehicle component FK executes a movement along a controlled movement trajectory. By means of the plurality of movements or movement trajectories carried out, a movement space of the vehicle component FK is spanned, which is detected by the detection unit 5 of the device 1. In one possible embodiment, the detection unit 5 detects the three-dimensional movement space of the vehicle component FK based on control data which are transmitted for example via a vehicle bus of a control unit to actuators of the vehicle component FK. Alternatively or additionally, the detection unit 5 can also comprise sensors which detect the movement of the vehicle component FK when carrying out the operations. For example, the detection unit 5 can comprise an optical sensor for detecting movements or movement trajectories of the vehicle component FK when carrying out the groundwork operations, in order to calculate a movement space of the vehicle component FK therefrom. In the embodiment shown in FIG. 2, the device 1 further comprises a sensor 7 for detecting the movement of the entire vehicle F. In the embodiment shown in FIG. 2, a navigation system 6 of the vehicle F further additionally provides navigation and position data to the data processing unit 3 for adapting the projection surface PF. The vehicle cameras 2-$i$ shown in FIG. 2 can be attached to different sides of the vehicle body KAR and continuously provide camera images or image frames KB to the data processing unit 3 for data evaluation. The vehicle environment view FUA generated by the data processing unit 3 is transmitted to the display unit 4 inside the driver's cabin KAB. The vehicle environment view shown on the display unit 4 assists the driver FA when carrying out the operations in the vehicle environment. As a result of the dynamically adapted projection surface, the driver FA obtains a realistic and predominantly distortion-free view of the entire vehicle environment. In the embodiment shown in FIG. 2, the device 1 further comprises a transceiver 8 for exchanging data with other vehicles or an access point in the vehicle environment.

Figure 3A:
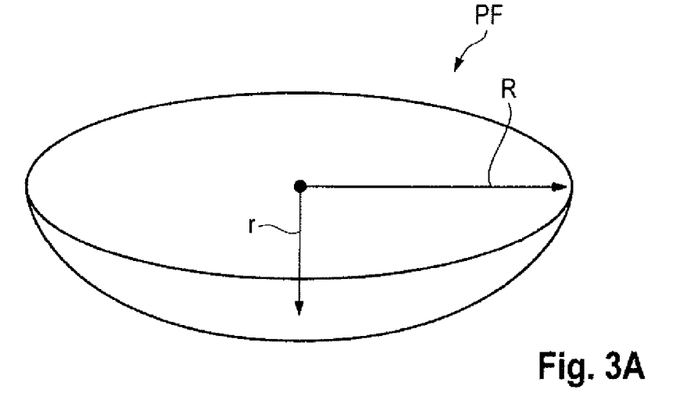
FIGS. 3A and 3B show an example of a projection surface of the type which can be used in the method according to the disclosure to provide a vehicle environment view.
Figure 3B:
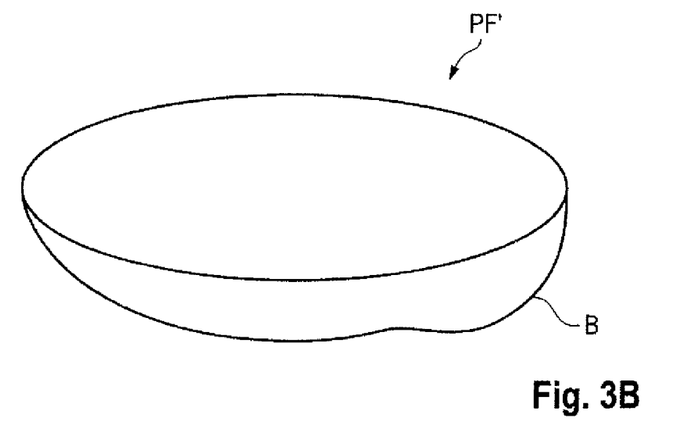

FIGS. 3A and 3B show, by way of example, a dish-shaped projection surface PF of the type which can be used during data processing by the image data processing unit 3 of the device according to the disclosure and the method according to the disclosure. In the example shown, FIG. 3A is a schematic view of an original, dish-shaped projection surface PF. In the embodiment shown, the dish-shaped projection surface PF has an outer radius R and a slightly greater inner radius r. In one possible embodiment, the projection surface PF is stored in an internal data storage unit of the data processing unit 3 and can be read out by a processor of the data processing unit 3 from said data storage for adaptation. Starting from the original projection surface PF, as shown in FIG. 3A, in the case of a sensor-detected movement of the vehicle component FK or in the case of a movement of the entire vehicle F, the image data processing unit 3 can dynamically adapt the virtual projection surface PF according to the movement space of the vehicle component FK which is detected by the detection unit 5 and/or the movement of the vehicle F. In this case, the original, dish-shaped projection surface PF is geometrically deformed according to the detected movement space. For example, the projection surface PF can be bulged, as shown schematically in FIG. 3B, and forms an adapted projection surface PF'. If for example the construction machine F, as shown in FIG. 2, excavates a hole L in the building ground located in front thereof, said hole is reflected in a corresponding bulge B in the projection surface PF'. The dish-shaped projection surface PF is thus adapted to the uneven surface of the vehicle environment. In this case, the uneven surface of the vehicle environment is derived from the movement space or the movement trajectories of the vehicle component FK. In one possible embodiment, the detection unit 5 detects that the work tool or the shovel AW is located below the normal ground level FE. From this, the detection unit 5 can detect the movement space of the vehicle component FK and the work tool AW thereof below the reference level FE. Said movement space substantially corresponds to the volume of the excavated hole L, as shown in FIG. 2. The extent of the shape of the projection surface PF', in particular the bulge B, in this case corresponds to the size of the detected movement space or the size of the excavated hole L.

Figure 4:
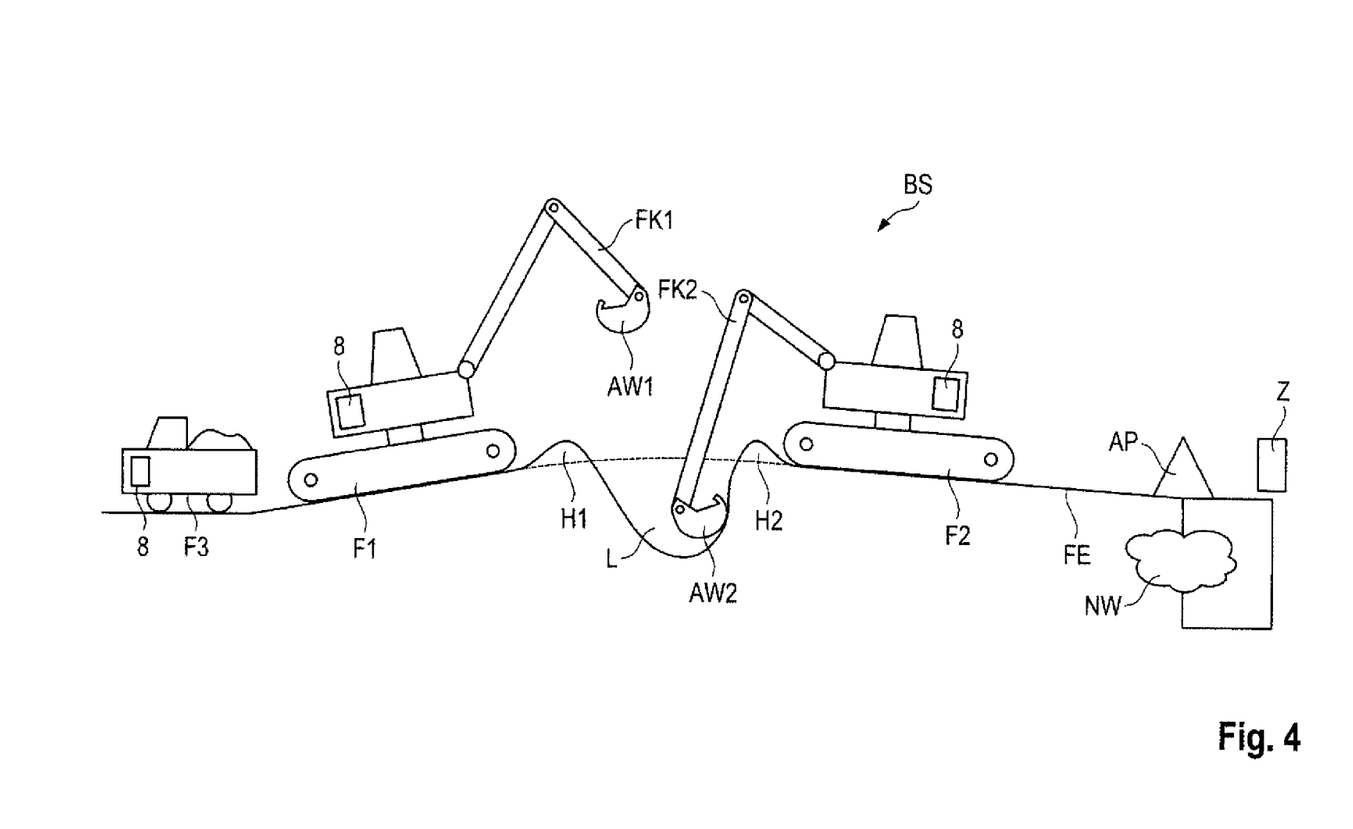
FIG. 4 shows an example of an application of the device according to the disclosure and of the method according to the disclosure for providing a vehicle environment view.

FIG. 4 is a schematic view of an application in which a plurality of vehicles F1, F2 work together, for example on a construction site BS, to carry out excavation operations. The two construction vehicles F1, F2 are located on a driving plane or driving ground and excavate a hole L together, using the work tools or shovels AW1, AW2 thereof. In this case, mounds H1, H2 form in front of the respective excavators F1, F2. In the embodiment shown, the two construction vehicles F1, F2 comprise a device 1 for providing a vehicle environment view FUA for each vehicle F1, F2. The two vehicles F1, F2 each comprise transceivers 8 for exchanging information data between the respective devices 1 to provide a vehicle environment view FUA via an air interface. The two vehicles F1, F2 can thus communicate with one another either directly or indirectly, for example via a satellite or via a third vehicle, and exchange relevant data, in particular movement space data, spatial data, position data or navigation data, with one another in real time. If for example a shovel AW2, which is located below the normal ground level FE, of a vehicle F2 excavates a hole L which is located in front of the other vehicle F1, it can transmit the movement space data, which are currently being detected and which relate to the movement of the shovel AW2 inside the hole L, to the transceiver 8 of the vehicle F1 via the communication air interface, which transceiver transmits the information data to the navigation system 6 of the vehicle F1 and to the data processing unit 3 inside the vehicle F1. Together with movement space data, the vehicle F2 can additionally transmit the current position data or local coordinates thereof via the air interface to the transceiver 8 of the vehicle F1, so that the image data processing unit 3 of the device 1 inside the vehicle F1 can derive the relative position of the vehicle F2 with respect to the vehicle F1 and thus can calculate the precise location of the excavated hole L in front of the vehicle F1. The image data processing unit 3 of the provision device 1 inside the vehicle F1 can then, based on the movement space data of the vehicle component FK2 which are received from the vehicle F1 and from the vehicle F2 via the communication interface, and/or based on the current movements of the two vehicles F1, F2, adapt the corresponding projection surface PF in real time, onto which projection surface the camera images KB provided by the vehicle cameras 2-i of the vehicle F1 are projected to generate the vehicle environment view FUA. For example, the projection surface PF which is used, as shown schematically in FIGS. 3A and 3B, can be bulged according to the excavated hole L. The two construction vehicles F1, F2 can communicate with other construction vehicles on the construction site BS, for example a heavy-goods vehicle F3, to remove loose material. For example, the vehicle F3 can be guided to the excavator which is currently excavating building material from the hole L. In the case of the scenario shown in FIG. 4, for example the heavy-goods vehicle F3 can be guided to the excavator F2 which is currently carrying out an excavation, in order to remove loose material from the excavated hole L. The movement space data, which indicate the movement space of the shovel AW2 below the ground level FE, thus reflect the excavated hole L. In one possible embodiment, the movement space data can be taken into consideration when controlling or steering another vehicle F3. For example, a driver of the heavy-goods vehicle F3 can be shown the location and shape of the hole L based on the movement space data, so that, when moving across the construction site from their starting position towards the vehicle F2, they drive around this excavated hole L.

In one possible embodiment, the movement space data, the position data, the navigation data and additional sensor data from the various vehicles F1, F2, F3 which are located on the construction site BS are transmitted to a central processor Z via an access point AP and a data network NW or by satellite, which processor coordinates the cooperation of the various vehicles F on the construction site BS. The central processor Z can be located directly on the construction site BS or can be located remotely in a data processing centre. In one possible embodiment, by means of the received data, in particular the movement space data and the position data of the vehicles F1, a three-dimensional data model of the current ground level FE of the construction site BS can be generated in real time. In this way, during the progress of the construction, the construction management always has a current data model of the ground level FE and can thus observe the progress of the construction in a reliable manner and take necessary measures. In one possible embodiment, the calculated data model of the ground level FE of the overall construction site BS is displayed to a site manager of the construction site via a user interface. In this way, the site manager obtains in real time a height profile of the construction site BS comprising excavated holes, trenches or mounds H1, H2. In another possible embodiment, in the case of the system shown by way of example in FIG. 4, it is possible for the various vehicles F1, F2, F3 to always transmit the respectively generated vehicle environment views FUA thereof to the central processor Z via the access point AP and the network so that the construction site manager is able to observe the various vehicle environment views FUA on a screen in real time during the progress of the construction. In this way, they can put themselves into each individual situation of the driver FA located in the vehicle F and coordinate the building work.

In another possible embodiment, the movement space data provided by the various vehicles F can additionally be evaluated in order to obtain further relevant information. For example, the detected movement space of a work tool AW below the normal ground level FE approximately corresponds to the excavated construction volume or the amount of excavated building material. In one possible embodiment, the amount of excavated building material is thus calculated based on the detected movement space. If the detected amount of building material exceeds a threshold value, for example another vehicle, in particular the heavy-goods vehicle shown in FIG. 4, can be guided to the excavated hole L to remove the deposited building material. In this way, the use of vehicles F on the construction site, in particular the removal of building materials, can be optimised.

According to another aspect, the disclosure thus provides a system for coordinating operations within a specific area, for example a construction site BS, comprising a plurality of cooperating vehicles F1, F2, F3 which each comprise a driver assistance system, as shown in FIG. 2. In this case, a transceiver 8 is used for communication with other driver assistance systems of adjacent vehicles and/or for communication with a central processor Z.

Figure 5:
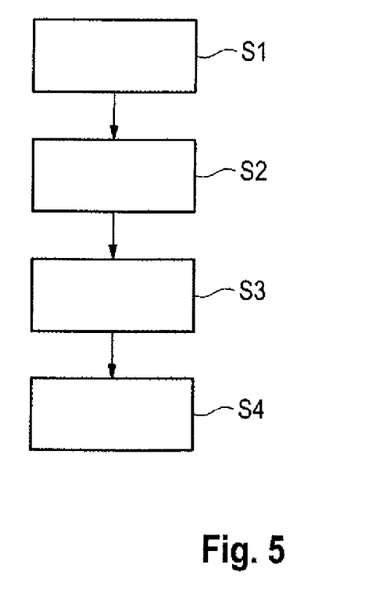
FIG. 5 is a simple flow diagram showing an embodiment of the method according to the disclosure for providing a vehicle environment view.

FIG. 5 is a flow diagram of one possible embodiment of the method according to the disclosure for generating a vehicle environment view FUA for a vehicle F. In a first step S1, camera images KB of a vehicle environment of the vehicle are provided. Subsequently, in a step S2, a movement space of at least one vehicle component FK of the vehicle and/or of the entire vehicle is detected. In step S3, a virtual projection surface PF is then adapted by an image data processing unit according to the detected movement space. Lastly, in step S4, the camera images KB provided are projected onto the adapted projection surface to generate the vehicle environment view of the vehicle. The generated vehicle environment view FUA is visually displayed to the driver FA of the vehicle F via a display unit. Preferably, a three-dimensional movement space of the vehicle component is detected in step S2 based on detected movement trajectories of the vehicle component FK which is moved by means of actuators.

The method shown in FIG. 5 is preferably carried out in real time by one or more microprocessors.

Additional embodiments are possible. In one possible embodiment, the calculated vehicle environment views FUA, which are displayed to the driver of the vehicle on the display thereof, are recorded in a data store. If, for example during excavation operations, infrastructure facilities, for example gas or water lines, are damaged, the vehicle environment views FUA of the construction vehicles F involved therein can be evaluated in order to find out the cause of the damage. In another possible embodiment, the movement trajectories of the vehicle components FK, in particular of the work tools AW provided therein, are evaluated in order to establish whether different infrastructure facilities, for example water or power supply lines, which are laid in the driving ground, are too close together. If for example the shovel AW of the vehicle F gets too close to the gas line GL shown in FIG. 2 or to the power supply line SL during the excavation operations, this can be displayed to the driver FA on the display, for example by means of a warning message or the like.

The device 1 according to the disclosure and the method according to the disclosure are suitable for any vehicles which actively intervene in the vehicle environment thereof, in particular construction vehicles, agricultural machinery vehicles or forestry vehicles.

REFERENCE NUMERALS 1 device for providing a vehicle environment view
2 vehicle cameras
3 data processing unit
4 display unit
5 detection unit
6 navigation system
7 sensors
8 transceiver
A arm
AP access point
AW work tool
BS construction site
F vehicle
FA driver
FK vehicle component
G articulation
GL gas line
H mound of debris
L excavation hole
NW network
SL power supply line
Z central processor

What is claimed is:

1. A device for providing a vehicle environment view for a vehicle comprising:
   a plurality of vehicle cameras configured to provide camera images of a vehicle environment of the vehicle;
   a detection unit configured to detect a movement space of at least one vehicle component of the vehicle; and
   an image data processing unit configured, based on the detected movement space of the at least one vehicle component of the vehicle, to adapt a projection surface onto which the camera images provided by the vehicle cameras are projected to generate the vehicle environment view,
   wherein the at least one vehicle component of the vehicle comprises at least one controllable, movable actuator, and
   wherein the detection unit is configured to detect the movement space of the at least one vehicle component of the vehicle according to control data which are used to control the at least one controllable, movable actuator of the at least one vehicle component.

2. The device according to claim 1, wherein the vehicle component comprises a work tool configured to be moved into the movement space of the vehicle environment in order to carry out operations.

3. The device according to claim 2, wherein the vehicle component comprises a hydraulically actuatable arm, to which the work tool is attached.

4. The device according to either claim 2, wherein the work tool of the vehicle component comprises a shovel for carrying out groundwork operations in the vehicle environment of the vehicle.

5. The device according to claim 1, wherein the detection unit is designed to detect movement trajectories of the vehicle component and to detect the movement space of the vehicle component based on the detected movement trajectories.

6. The device according to claim 1, wherein the image data processing unit is further configured to adapt the projection surface according to navigation data and/or spatial data obtained by the image data processing unit from a navigation system of the vehicle and/or from an adjacent vehicle.

7. The device according to claim 1, wherein the projection surface is a dish-shaped projection surface which is adapted according to the detected movement space of the vehicle component.

8. The device according to claim 1, wherein the image data processing unit is configured to dynamically adapt the projection surface starting from an original projection surface in the case of a sensor-detected movement of the vehicle component, according to the movement space of the vehicle component which is detected by the detection unit.

9. The device according to claim 1, wherein the original projection surface is a dish-shaped projection surface that is geometrically deformed according to the detected movement space.

10. The device according to claim 1, further comprising:
    a display unit configured to display the vehicle environment view generated by the image data processing unit to a driver of the vehicle.

11. The device according to claim 1, wherein the device is included in a driver assistance system for the vehicle.

12. A method for generating a vehicle environment view for a vehicle, comprising:
    providing camera images of a vehicle environment of the vehicle;
    detecting a movement space of at least one vehicle component of the vehicle;
    adapting a projection surface according to the detected movement space; and
    projecting the provided camera images onto the adapted projection surface to generate the vehicle environment view,
    wherein the movement space of the at least one vehicle component of the vehicle is detected according to control data which are used to control at least one controllable, movable actuator of the at least one vehicle component.

13. The method according to claim 12, further comprising:
    detecting a three-dimensional movement space of the vehicle component based on detected movement trajectories of the vehicle component which is moved by the at least one controllable, movable actuator.

14. A system for coordinating operations within an area, comprising:
    a plurality of vehicles which each have a driver assistance system connected to a transceiver for communication with other driver assistance systems of adjacent vehicles and/or to a central processor,
    wherein each driver assistance system includes a device for providing a vehicle environment view for each corresponding vehicle that comprises (i) a plurality of vehicle cameras configured to provide camera images of a vehicle environment of the vehicle, (ii) a detection unit configured to detect a movement space of at least one vehicle component of the vehicle, and (iii) an image data processing unit configured, based on the detected movement space of the at least one vehicle component of the vehicle, to adapt a projection surface onto which the camera images provided by the vehicle cameras are projected to generate the vehicle environment view, wherein the at least one vehicle component of the vehicle comprises at least one controllable, movable actuator, and wherein the detection unit is configured to detect the movement space of the at least one vehicle component of the vehicle according to control data which are used to control the at least one controllable, movable actuator of the at least one vehicle component.

* * * * *